(12) United States Patent
McCullagh et al.

(10) Patent No.: US 7,684,993 B2
(45) Date of Patent: Mar. 23, 2010

(54) VALUE DIAGNOSTIC TOOL

(75) Inventors: Peter McCullagh, Lewisville, TX (US);
Mark Stevens, Atlanta, GA (US);
Michael Paulson, Atlanta, GA (US);
Marc Salinas, Dallas, TX (US);
Cameron Janes, San Francisco, CA (US); Anastasia Cheung, San Mateo, CA (US); Edmund (Ned) Leonard, Alameda, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1738 days.

(21) Appl. No.: 10/661,877

(22) Filed: Sep. 11, 2003

(65) Prior Publication Data
US 2007/0239466 A1 Oct. 11, 2007

(51) Int. Cl.
*G06Q 10/00* (2006.01)
(52) U.S. Cl. .............................. 705/1; 705/7
(58) Field of Classification Search ...................... 705/1
See application file for complete search history.

(56) References Cited

U.S. PATENT DOCUMENTS

| | | | | |
|---|---|---|---|---|
| 7,246,074 B1 * | 7/2007 | Hutchins et al. | ............... | 705/7 |
| 2002/0038217 A1 * | 3/2002 | Young | ........................... | 705/1 |
| 2003/0050814 A1 * | 3/2003 | Stoneking et al. | .............. | 705/7 |
| 2003/0115191 A1 * | 6/2003 | Copperman et al. | ............ | 707/3 |
| 2003/0187675 A1 * | 10/2003 | Hack et al. | ..................... | 705/1 |
| 2003/0233249 A1 * | 12/2003 | Walsh et al. | ................... | 705/1 |
| 2004/0249688 A1 * | 12/2004 | Sanders et al. | ................. | 705/7 |
| 2004/0260585 A1 * | 12/2004 | Spangenberg et al. | .......... | 705/7 |

OTHER PUBLICATIONS

SAP.com, Jun. 5, 2002.*

* cited by examiner

*Primary Examiner*—John G Weiss
*Assistant Examiner*—Candice D Carter
(74) *Attorney, Agent, or Firm*—Campbell Stephenson LLP

(57) ABSTRACT

User-specified information pertaining to business challenges of an organization is received, and one or more predefined business processes that address the business challenges of the organization are identified. Further, the one or more predefined business processes are recommended to a user. In one embodiment, the user is provided with recommendations on best practices addressing the business challenges of the organization.

34 Claims, 16 Drawing Sheets

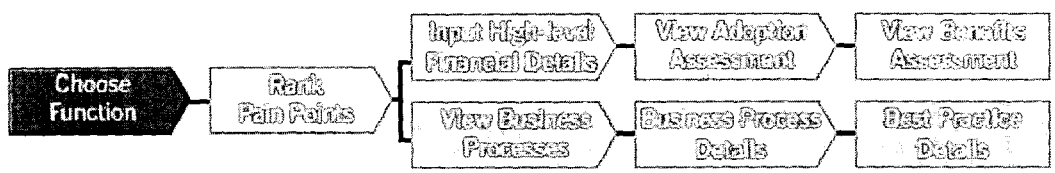

Choose Function

To begin, choose a function that you would like to evaluate. You may return to assess additional functions, and the latest results of each assessment you complete are saved for later review and updates.

| Function | Assess This Function | View Previous Assessment |
|---|---|---|
| Sales | | Review results or update inputs |→ |
| Service | | Review results or update inputs |→ |
| Marketing | Begin the assessment |→ | |
| Employees | Begin the assessment |→ | |
| Partners | Begin the assessment |→ | |
| Integration | Begin the assessment |→ | |

FIG. 6A

Function: Sales

Rank Pain Points

Next, please rank the performance of your business for each of the following pain points relating to Sales on a scale of 1 to 4 as follows:

1. Poor
2. Below Average
3. Above Average
4. Best in Class

Your overall level of adoption of integrated business processes and related best practices for Sales will be assessed based on your rankings for all pain points listed below.

Also, please identify the three pain points from the list below that are most important to your business. High-level financial and performance benefits will be estimated based on the value of fully adopting integrated business processes and related best practices for the three pain points you choose.

| Sales Pain Points | Ranking 1=Poor, 4=Best in Class | Most Important (Three only) |
|---|---|---|
| | Save Pain Point Information | |
| Optimizing sales team resource allocation and managing territories | ●1 ○2 ○3 ○4 | ☑ |
| Producing accurate, timely, actionable sales forecasts | ●1 ○2 ○3 ○4 | ☑ |
| Understanding and managing the day-to-day focus of the sales organization | ●1 ○2 ○3 ○4 | ☑ |
| Ensuring that new sales team members learn and contribute quickly | ●1 ○2 ○3 ○4 | ☐ |
| Maximizing the overall productivity of the sales organization | ●1 ○2 ○3 ○4 | ☐ |
| Qualifying and prioritizing leads | ●1 ○2 ○3 ○4 | ☐ |
| Routing leads to the appropriate sales team members and ensuring timely follow-up | ●1 ○2 ○3 ○4 | ☐ |
| Ensuring that sales teams fully understand customers' businesses, pain points, strategic and financial priorities, and industries | ●1 ○2 ○3 ○4 | ☐ |
| Maintaining a consistent and effective approach to selling | ●1 ○2 ○3 ○4 | ☐ |
| Delivering accurate, high-quality, current sales proposals | ●1 ○2 ○3 ○4 | ☐ |
| Generating accurate, valid quotes consistently based on the latest product, pricing, configuration, and bundling information | ●1 ○2 ○3 ○4 | ☐ |
| Providing sales teams with up-to-date information regarding product availability, order status, and shipping status | ●1 ○2 ○3 ○4 | ☐ |
| Communicating order information internally and externally for fulfillment | ●1 ○2 ○3 ○4 | ☐ |
| Implementing and maintaining simple, transparent, flexible, and effective sales compensation systems | ●1 ○2 ○3 ○4 | ☐ |
| Selling collaboratively over the Web | ●1 ○2 ○3 ○4 | ☐ |
| Managing product portfolios and catalogs | ●1 ○2 ○3 ○4 | ☐ |
| Establishing and maintaining effective pricing strategies | ●1 ○2 ○3 ○4 | ☐ |
| | Save Pain Point Information | |

FIG. 6B

Function: Sales

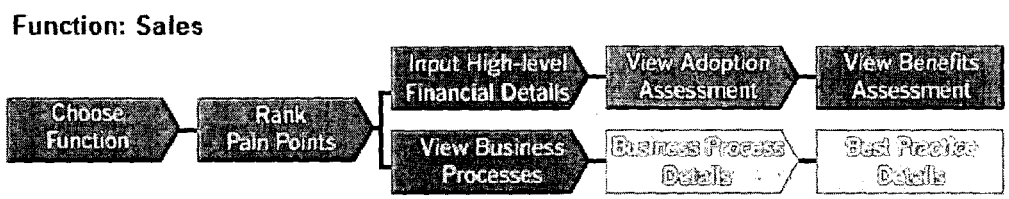

Input Industry and High-Level Financial Details

To enable us to quantify the potential financial impact on your business of successfully addressing the pain points you have identified, please input your industry and annual revenue from your most recent fiscal year. Then, accept or modify the dollar values and percent of revenue that we estimate for selling, general, and administrative costs, based on your revenue and industry.

| Step 1 | |
|---|---|
| Select your industry: | Cross Industry Average ▼ |

| Step 2 | |
|---|---|
| Total annual revenue: | $ 10,000 |
| Total annual selling, general, and administrative costs: | $ 3,600   or  36 % of revenue. |

[ Submit ]

FIG. 7

Benefits Self Assessment

Please input your estimates, in terms of percent improvement, for the benefits that your business can achieve from successfully addressing each of the most important pain points you have identified.

If you have assessed more than one functional area it is important to understand that the benefits self assessment is cumulative in nature and any additional benefit values are incremental to the values previously reported for other functional areas.

|  | % Increase in Total Annual Revenue | % Decrease in Selling, General, & Administrative Costs | % Increase in Customer Satisfaction | % Increase in Employee Morale |
|---|---|---|---|---|
| Optimizing sales team resource allocation and managing territories | 0 % | 0 % | 0 % | 0 % |
| Producing accurate, timely, actionable sales forecasts | 0 % | 0 % | | |
| Understanding and managing the day-to-day focus of the sales organization | 0 % | 0 % | | |

[ Save Financial Details and Self-Assessment ]

FIG. 8

Function: Sales

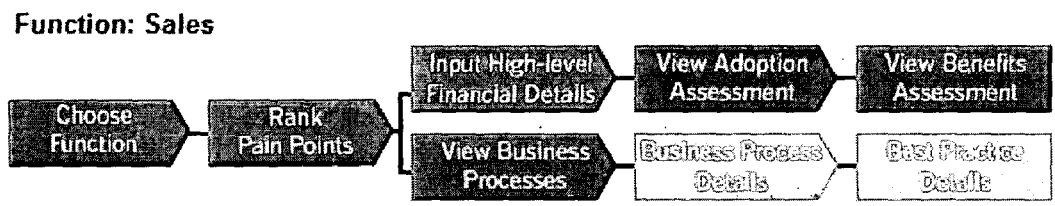

Adoption Assessment

Based on the type and severity of pain points you have identified for Sales, we classify your company as having Substantial Improvement Opportunities.

| Level of Adoption | Description |
|---|---|
| 1 - Substantial Improvement Opportunities | Developing and implementing comprehensive Customer, Partner, and Employee Relationship Management strategies can greatly increase competitiveness by addressing critical pain points and generating significant financial returns |
| 2 - Early-Stage Adopter | Building on early successes to impact additional pain points can create competitive advantage |
| 3 - Emerging Leader | Focused achievement of best practices for remaining pain points can solidify industry leadership |
| 4 - Best Practitioner | Maintaining leading-edge business processes and best practices and ensuring consistent and efficient execution can extend competitive advantage over time |

[ Continue to Benefits Summary ]

FIG. 9

High-Level Benefits Summary

The following is an assessment of the impact on high-level financial and performance measures from successfully addressing the Pain Points that you have identified as being most important to your business. Two sets of estimates are provided: one based on the percent improvements you just input, and another set of conservative improvements based on our experience with over 3,000 customer implementations.

Based on Your Estimated Percent Improvements From Successfully Addressing Top Pain Points

Estimated Direct Revenue, Cost, Customer Satisfaction, and Employee Morale Benefits

| | | Total Annual Revenue | Total Annual Selling, General, and Administrative Costs¹ | Customer Satisfaction² | Employee Morale³ |
|---|---|---|---|---|---|
| Sales | % Improvement | 1.5% | 5.0% | | |
| | Annual Dollar Value | 2.6 | 3.0 | 10.0% | 10.0% |
| Service | % Improvement | | | See Below | See Below |
| Marketing | % Improvement | 3.0% | 2.5% | 5.0% | 2.0% |
| | Annual Dollar Value | 5.0 | 1.5 | See Below | See Below |
| Employees | % Improvement | | | | |
| Partners | % Improvement | | | | |
| Integration | % Improvement | 0.0% | 4.0% | 0.0% | 0.0% |
| | Annual Dollar Value | | 2.4 | See Below | See Below |
| Total | % Improvement | 4.5% | 11.5% | 15.0% | 12.0% |
| | Annual Dollar Value | 7.6 | 6.9 | See Below | See Below |

Estimated Additional Revenue and Cost Benefits from Direct Customer Satisfaction and Employee Morale Benefits Listed Above ²,³

| Total Customer Satisfaction | % Improvement 2,3 | 3.0% | 0.0% |
| | Annual Dollar Value | 5.0 | |
| Total Employee Morale | % Improvement 2,3 | 0.0% | 1.5% |
| | Annual Dollar Value | | 0.5 |
| Total | Annual Dollar Value | 5.0 | 0.5 |

Estimated Total Revenue and Cost Benefits to your Organization

| Total Financial Benefit | Annual Dollar Value | 12.5 | 7.6 |

Based on our Estimated Percent Improvements From Successfully Addressing Top Pain Points

| | | Total Annual Revenue | Total Annual Selling, General, and Administrative Costs¹ | Customer Satisfaction² | Employee Morale³ |
|---|---|---|---|---|---|
| Sales | % Improvement | | | | |
| Service | % Improvement | 1.0% | 3.0% | 8.0% | 5.0% |
| | Annual Dollar Value | 1.7 | 1.8 | See Below | See Below |
| Marketing | % Improvement | 2.0% | 0.0% | 5.0% | 5.0% |
| | Annual Dollar Value | 3.3 | | See Below | See Below |
| Employees | % Improvement | | | | |
| Partners | % Improvement | | | | |
| Integration | % Improvement | 0.0% | 3.0% | 0.0% | 0.0% |
| | Annual Dollar Value | | 1.8 | See Below | See Below |
| Total | % Improvement | 3.0% | 6.0% | 13.0% | 10.0% |
| | Annual Dollar Value | 5.0 | 3.6 | See Below | See Below |

| Total Customer Satisfaction | % Improvement 2,3 | 2.6% | 0.0% |
| | Annual Dollar Value | 4.3 | |
| Total Employee Morale | % Improvement 2,3 | 0.0% | 1.3% |
| | Annual Dollar Value | | 0.8 |
| Total | Annual Dollar Value | 4.3 | 0.8 |

| Total Financial Benefit | Annual Dollar Value | 9.3 | 4.4 |

¹ Improvement Percentages and Savings Estimates assume that Selling, General, and Administrative Costs are composed as follows: Selling Costs (35%), Marketing Costs (15%), Service Costs (25%), IT Costs (5%), Other Costs (20%)

² Although no Revenue benefits have been included in "Direct" estimates for improvements in Customer Satisfaction, we have generally noted an additional 1-3% increase in total revenue for each 10% increase in Customer Satisfaction levels. This revenue increase is itemized separately in the "Estimated Additional Revenue and Cost Benefits" section of the High-Level Benefits Summary ³ Although no Cost benefits have been included in "Direct" estimates above for improvements in Employee Morale, we have generally noted an additional 0.5-2% decrease in total Selling, General, and Administrative Expenses for each 10% increase in Employee Morale levels. This cost decrease is itemized separately in he "Estimated Additional Revenue and Cost Benefits" section of the High-Level Benefits Summary

FIG. 10

Function: Sales

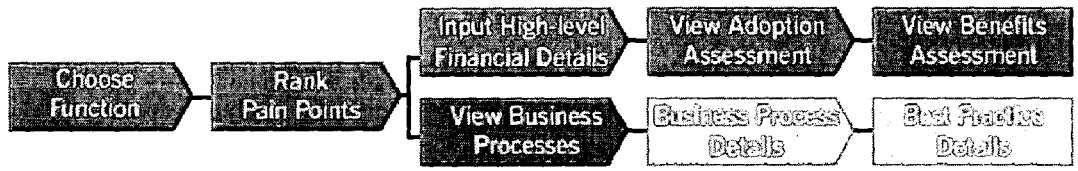

Summary of Related Business Processes

To begin developing a strategy for addressing the pain points you have identified, drill down on the related business processes below. Each business process includes detailed information to help you better understand how this business process could benefit your company:

- Business process description
- Performance metrics to measure and evaluate process effectiveness
- Best practices designed to ensure your success
- Success stories of customers who have successfully addressed similar pain points

| Optimizing sales team resource allocation and managing territories | |
|---|---|
| YOUR RANKING<br>1<br>(1=Poor, 4=Best in Class) | Related Business Processes: Define Sales Segmentation<br><br>Construct Coverage Strategy<br><br>Plan Sales Force Quotas |

| Producing accurate, timely, actionable sales forecasts | |
|---|---|
| YOUR RANKING<br>1<br>(1=Poor, 4=Best in Class) | Related Business Processes: Define and Revise Methodology<br><br>Create Sales Forecast<br><br>Register Opportunity |

FIG. 11

Function: Sales

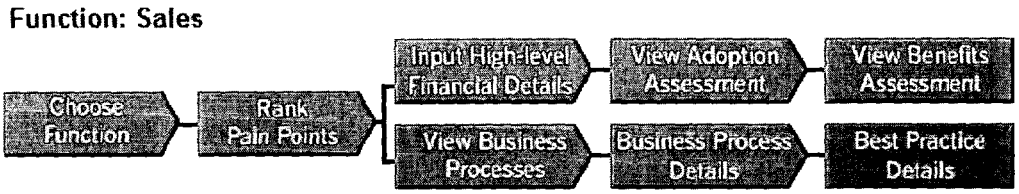

Strategic Best Practice Details

Strategic best practices are key to the overall success of a business process. Key success factors describe people, process, and general technology considerations for implementing each strategic best practice successfully.

| Implement a consistent sales methodology to optimize, coordinate, and manage selling efforts ||
|---|---|
| Detailed Description | Effective sales methodologies provide a common framework for sales execution considering such factors as overall corporate strategy, selling strategy and organization, products, target customers, and competitive dynamics. Sales methodologies define the sales process and provide a common language for assessing deal status, including such factors as timing and likelihood of closure. Sales methodologies also help optimize selling tactics and focus effort for particular accounts and opportunities.<br><br>Standard sales methodologies improve sales efficiency and productivity by ensuring the consistent application of optimal selling approaches, improving communication and collaboration among distributed sales teams, and providing a consistent foundation for managing complex and distributed sales organizations. |
| Key Success Factors | • Sales management must define an appropriate sales methodology in light of internal and external needs and requirements<br>• Sales management must drive adoption of the sales methodology by communicating its value to sales reps in their own terms, ensuring that well respected sales rep "floor leaders" champion adoption, providing coaching and training, and measuring and rewarding adherence and adoption<br>• Information systems must consistently support the implementation of the chosen sales methodology throughout the organization<br>• Information systems must provide role-specific selling assistance to individuals based on their role within the sales team<br>• Information systems must support the real-time aggregation and analysis of key deal status indicators defined by the sales methodology across such variables as sales periods, accounts, sales reps, sales stages, products, and regions<br>• Information systems must track key indicators of usage and adoption of the sales methodology by individual sales reps<br>• Sales management must adopt the sales methodology into its own processes, such as pipeline management and forecasting |

Return to Business Process

FIG. 13

Function: Sales

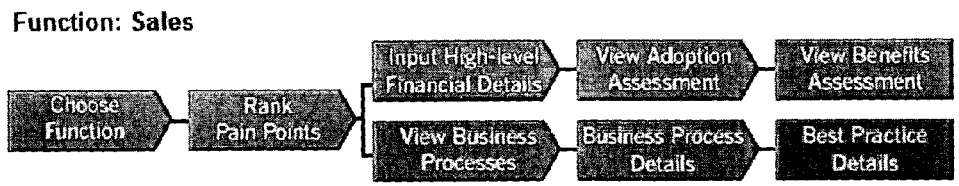

Best Practice Functionality Details

Understand how our industry-leading applications facilitate and support the optimal execution of each Business Process through pre-packaged, "digital" best practices.

| ESP-Based Named Account Selling | |
|---|---|
| Detailed Description | The Enterprise Selling Process (ESP) is a structured methodology for sales, sales support and marketing teams responsible for penetrating, covering and growing their largest accounts. The ESP Methodology includes the following<br><br>• Account segmentation to ensure that the account team identifies and sells across multiple units of the account.<br>• Planning and strategy development to win new business and use partner and customer relationships.<br>• Creating action plans to measure and monitor progress against the account plan in order to assure continuous opportunity development and relationship management. |

FIG. 14

VALUE DIAGNOSTIC TOOL

FIELD OF THE INVENTION

This invention relates generally to business process modeling, and more particularly to facilitating development of a business solution for addressing business challenges of an organization.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Siebel Systems, Inc., All Rights Reserved.

BACKGROUND OF THE INVENTION

The Internet is transforming corporate architectures. Businesses are now recreating themselves to become more efficient and to find new business opportunities. Various technologies have emerged to assist in the automation of companies' operations. These technologies may include, for example, Customer Relationship Management (CRM), Partner Relationship Management (PRM), Employee Relationship Management (ERM), etc. Customer Relationship Management (CRM) is a technology designed to help companies to improve their interaction with customers. Effective CRM typically requires an integrated sales, marketing and service strategy, supported by CRM software that provides profiles and histories of each interaction the company has with each customer. Building an effective CRM system into a company's infrastructure is a complex and expensive task. Before deciding to make such an investment, a company needs to understand how much additional value it can realize by improving its business infrastructure and what business processes are most important to achieve the desired results.

Traditional value diagnostic tools provide value estimates to companies desiring to automate their processes. However, these value diagnostic tools typically quantify value estimates based primarily on the capability of a vendor's software and do not take into account the degree to which these capabilities are important to an organization or the level of success the organization has already achieved in these areas. In addition, traditional value diagnostic tools typically fail to provide any qualitative recommendations to illustrate how the company can capture the value outlined in the diagnostic.

SUMMARY OF THE INVENTION

The present invention relates to various aspects for developing a solution addressing business challenges of an organization.

According to one aspect of the present invention, user-specified information pertaining to business challenges of an organization is received, and one or more predefined business processes that address the business challenges of the organization are identified. These predefined business processes are then recommended to a user.

The present invention describes systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 6A-14 illustrate exemplary user interfaces provided by one embodiment of a diagnostic tool.

DETAILED DESCRIPTION OF THE INVENTION

Figure 1:
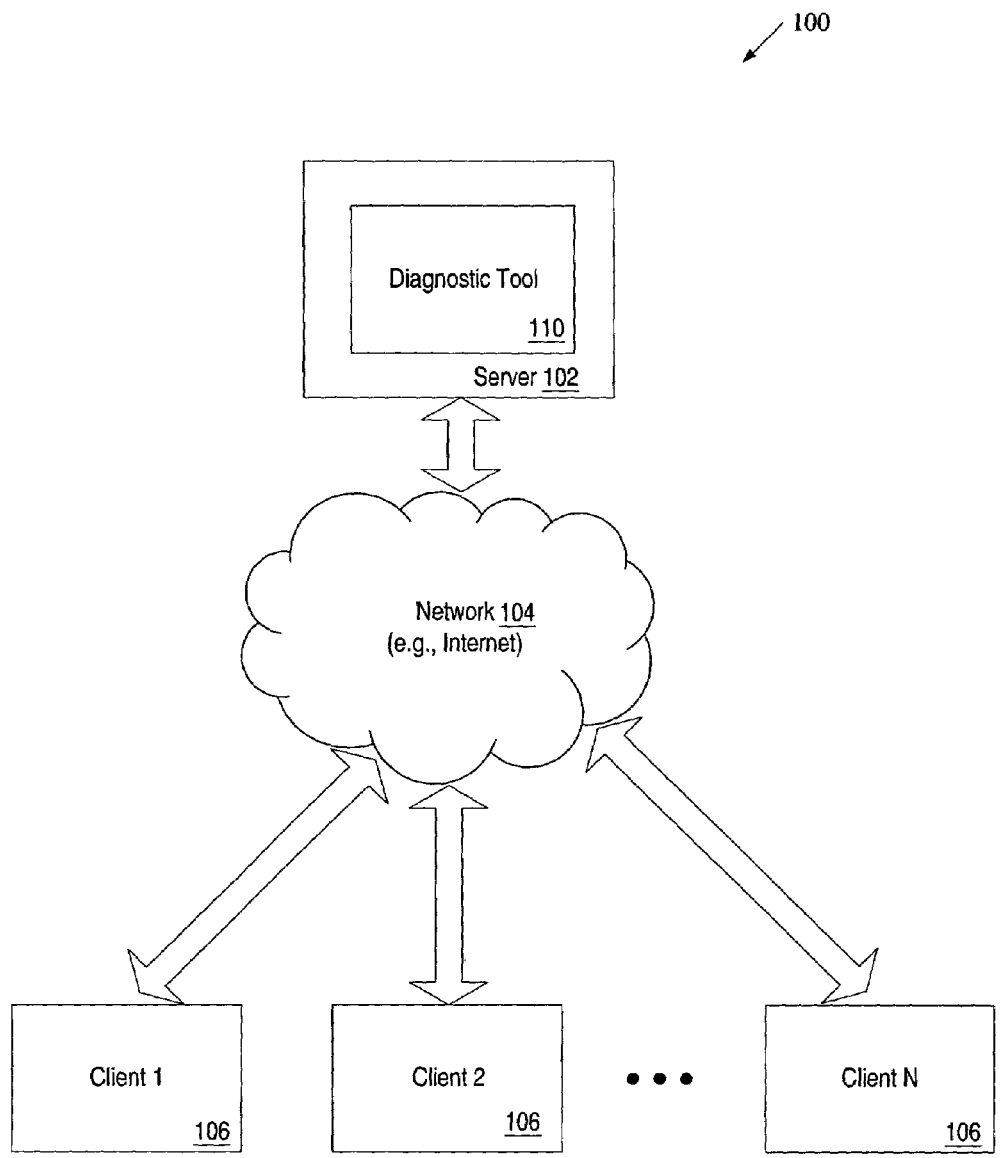
FIG. 1 is a block diagram of one embodiment of a business operation diagnostic system.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The present invention relates to various aspects for developing a solution addressing business challenges of an organization. Business challenges (also referred to as pain points) identify problems with various aspects within an organization's infrastructure. These problems may result from, for example, insufficient automation of business processes used by the organization, flawed business processes used by the organization, etc.

In one embodiment, a diagnostic tool is provided that operates based on user-specified information pertaining to business challenges of an organization. In one embodiment, the user-specified information pertaining to business challenges of the organization is obtained by presenting to a user a list of business challenges commonly experienced by various companies and requesting the user to rank the performance of the company with respect to each business challenge in the list. In one embodiment, the list of commonly experienced business challenges is specific to a function selected by the user for evaluation. A function defines a certain area of operation. For example, a function may represent sales operations, service operations, marketing operations, employee interaction operations, partner interaction operations, technology integration operations, etc. In one embodiment, the user-specified information pertaining to business challenges of the organization also includes user input indicating the importance of business challenges to the organization. In addition, in one embodiment, the user-specified information pertaining to business challenges of the organization includes industry and revenue data associated with the organization.

In one embodiment, when the diagnostic tool receives the user-specified information pertaining to business challenges of the organization, it assesses the current strength of the organization, estimates benefits that are to be gained by the organization if its business challenges are successfully addressed, and presents the estimated benefits to the user.

Next, the diagnostic tool identifies business processes that can address these business challenges. The business processes were developed in advance. In one embodiment, they are part of a specific software product (or multiple software products). Alternatively, the business process may cover partially or entirely people-related activities.

Further, the diagnostic tool recommends the identified business processes to the user. In one embodiment, the diagnostic tool displays each business challenge together with corresponding business processes and allows the user to view details about each business process (e.g., key performance metrics, products required to implement business processes, etc.). In one embodiment, the diagnostic tool also provides strategic best practice recommendations and functional best practice recommendations. Strategic best practice recommendations focus on what the company has to do to introduce the identified business processes into its infrastructure. Functional best practice recommendations focus on how to optimize the introduction of the business processes to capture the greatest business value. The best practice recommendations are developed based on experience and expertise (e.g., experience with prior customers) obtained over a period of time (e.g., over 10 years).

Accordingly, in one embodiment, the diagnostic tool provides users with a solution for addressing their individual business challenges, estimates benefits the company can gain by implementing this solution, and provides a roadmap for incorporating this solution into the company's infrastructure.

Business Operation Diagnostics

FIG. 1 is a block diagram of one embodiment of a business operation diagnostic system 100. The business operation diagnostic system 100 includes a server 102 and a number of client devices 106 (clients 1 through N) coupled to the server 102 via a communications network 104. The communications network 104 may be, for example, a wide area network (e.g., the Internet), a local area network (LAN), a wireless network (e.g., a cellular network), the Plain Old Telephone Service (POTS) network, etc.

Each client 106 represents a device that allows a user to communicate with the server 102. The user may be a representative (e.g., an employee) of a company or any other organization. The server 102 includes a diagnostic tool 110 that performs evaluation of an organization's business operations and provides recommendations for improving the organization's business operations. In one embodiment, the evaluation is performed based on the degree of adoption of available automated technologies by the organization and integration of these automated technologies into the infrastructure of the organization. Examples of such technologies include a customer relationship management (CRM) technology, a partner relationship management (PRM) technology, an employee relationship management (ERM) technology, etc.

The diagnostic tool 110 operates based on user-specified information pertaining to business challenges of an organization. In one embodiment, the user-specified information pertaining to business challenges includes the user's ranking of the organization performance with respect to business challenges commonly experienced by various companies. In addition, in one embodiment, the user-specified information pertaining to business challenges of the organization also includes user input indicating the importance of business challenges to the organization.

When the diagnostic tool 110 receives the user-specified information pertaining to business challenges of the organization, it identifies business processes that can address these business challenges and recommends these business processes to the user. The business processes were developed in advance. In one embodiment, the business processes are part of a specific software product (or multiple software products). In one embodiment, the server 102 is associated with a software vendor that develops these products. Alternatively, the business processes cover partially or entirely people related activities. In one embodiment, the diagnostic tool 110 also identifies best practices that can address the business challenges of the organizations and recommends the best practices to the user. A best practice referred to herein is a technique or methodology that, through experience and research, has proven to reliably lead to a desired result.

Figure 2:
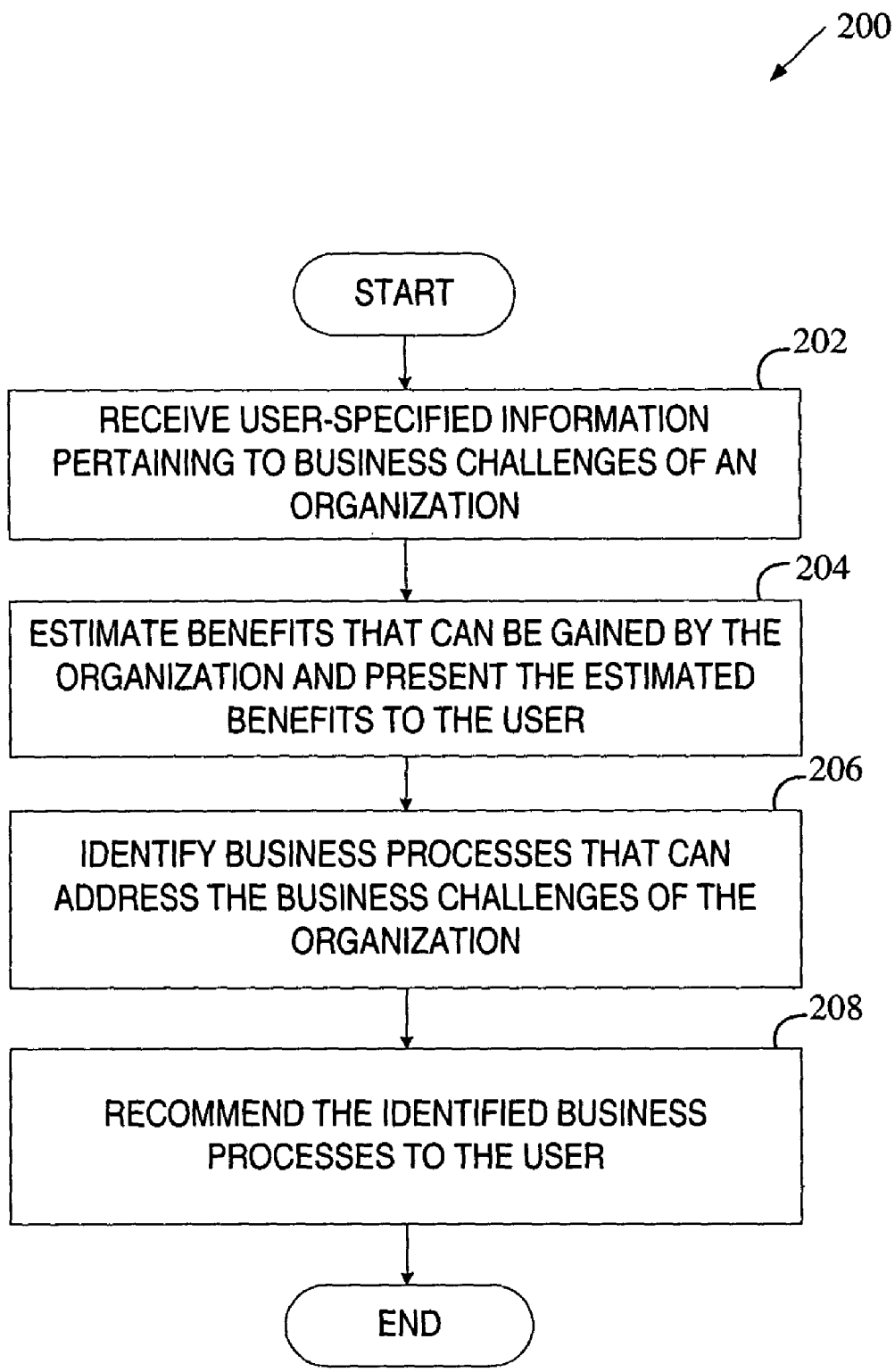
FIG. 2 is a flow diagram of one embodiment of a process for developing a solution addressing business challenges of an organization.

FIG. 2 is a flow diagram of one embodiment of a process 200 for developing a solution addressing business challenges of an organization. The process may be performed by processing logic that may comprise hardware (e.g., circuitry, dedicated logic, etc.), software (such as run on a general purpose computer system or a dedicated machine), or a combination of both. Processing logic may reside on the server 102 or any other device coupled to the server 102.

Referring to FIG. 2, process 200 begins with processing logic receiving user-specified information pertaining to business challenges of an organization (processing block 202). Business challenges (also referred to as pain points) identify problems with various aspects within an organization's infrastructure. In one embodiment, processing logic obtains the user-specified information pertaining to business challenges of the organization by presenting to the user a list of business challenges commonly experienced by various companies and requesting the user to rank the performance of the company with respect to each business challenge in the list. In one embodiment, the list of commonly experienced business challenges is specific to a function selected by the user for evaluation. The function covers a certain area of operation (e.g., sales operations, service operations, marketing operations, employee interaction operations, partner interaction operations, technology integration operations, etc.). In one embodiment, the user-specified information pertaining to business challenges of the organization also includes user input indicating the importance of business challenges to the organization. In addition, in one embodiment, the user-specified information pertaining to business challenges of the organization includes industry and revenue data associated with the organization.

Next, in one embodiment, processing logic estimates benefits that can be gained by the organization if its business challenges are successfully addressed, and presents the estimated benefits to the user (processing block 204).

Further, processing logic identifies business processes that can address the business challenges of the organization (processing logic 206) and recommends the identified business processes to the user (processing block 208). In one embodiment, processing logic displays to the user each business challenge together with corresponding business processes and allows the user to view details about each business process (e.g., key performance metrics, products required to implement business processes, etc.).

In one embodiment, processing logic identifies best practices that can address the business challenges of the organization and recommends the identified best practice to the user.

Figure 3:
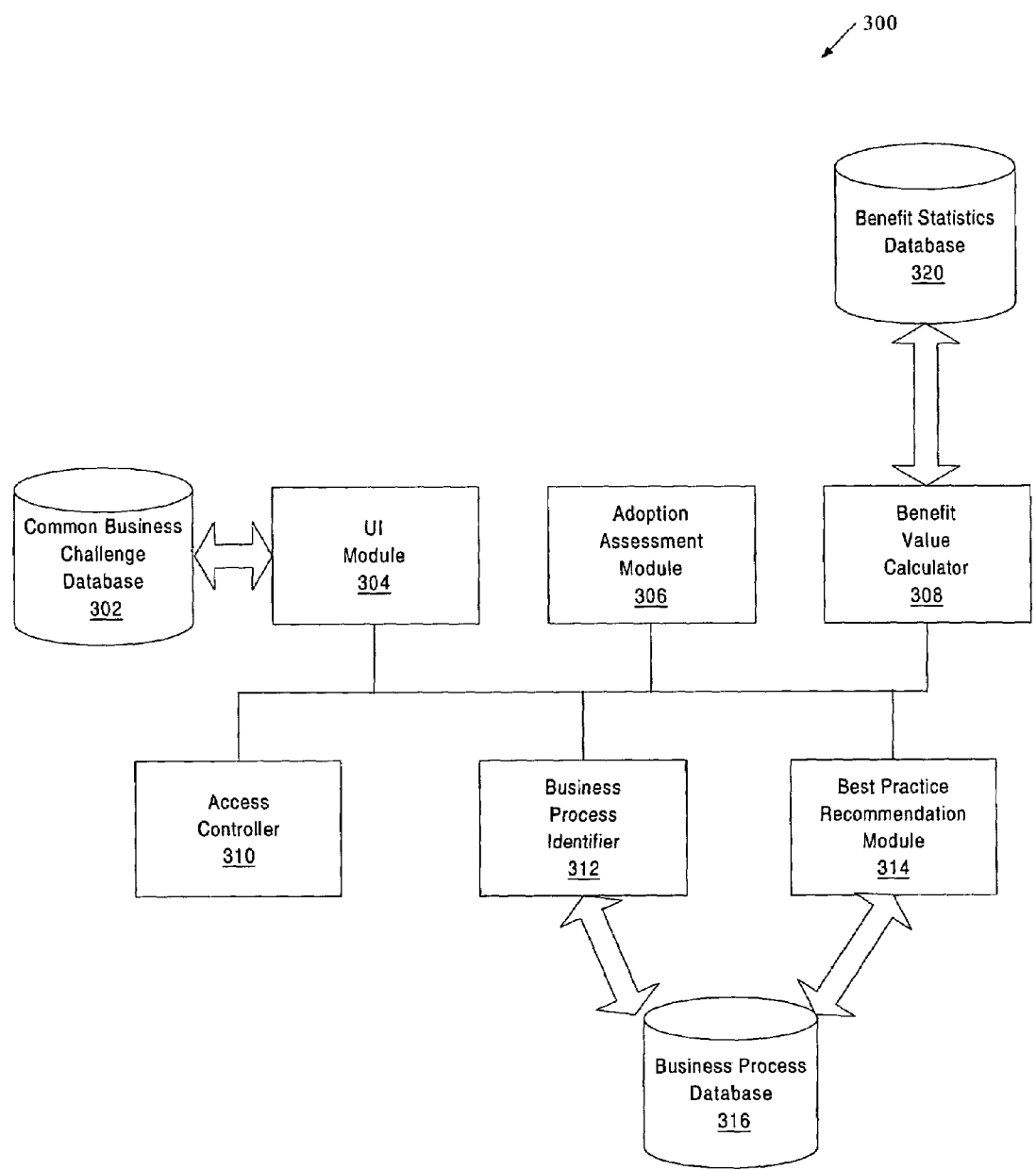
FIG. 3 is a block diagram of one embodiment of a diagnostic tool.

FIG. 3 is a block diagram of one embodiment of a diagnostic tool 300. The diagnostic tool 300 includes a user interface (UI) module 304, an adoption assessment module 306, a benefit value calculator 308, an access controller 310, a business process identifier 312, a best practice recommendation module 314, a common business challenge database 302, a benefit statistics database 320, and a business practice database 316. In one embodiment, the common business challenge database 302, the benefit statistics database 320, and the business practice database 316 are combined into a single database.

The common business challenge database 302 stores data identifying business challenges commonly experienced by various organizations. In one embodiment, each business challenge is associated with a specific area of company operation referred to as a function (e.g., sales, services, marketing, employee interactions, partner interaction, technology integration).

The UI module 304 is responsible for generating a function UI that facilitates user selection of a function to be evaluated. In addition, the UI module 304 is responsible for generating a business challenge interface that displays a list of commonly experienced business challenges retrieved from the common business challenge database 302 for the specified function and facilitates user input of business challenge information. In one embodiment, the business challenge information identifies the user ranking of the company's performance for each business challenge in the list and specifies the business challenges that are important to the company.

Next, the UI module 304 is responsible for generating an industry and revenue UI that facilitates user input of industry and revenue data and a benefits self assessment UI that facilitates input of user estimates of benefits that the company can achieve from successfully addressing each of the most important business challenges.

The adoption assessment module 306 is responsible for assessing the level of adoption of the company for the function being evaluated. For example, for the service function, the adoption assessment module 306 may assess how effective the company's service operations are in building lasting and profitable customer relationships. The company's adoption level may range from a level indicating a collection of disconnected systems to a level of a fully collaborative e-business. In one embodiment, each adoption level is associated with a specific range of ranking totals, and the assessment is performed by calculating the total of the user-specified ranking scores for the business challenges and determining which range the calculated total belongs to.

The benefit statistics database 320 stores statistical data that identifies estimated benefits that can be achieved from addressing various business challenges. The statistical data may be provided by a third party or be collected by the diagnostic tool 330 based on the experiences with its users. In one embodiment, the statistical data is stored in association with a specific industry.

The benefit value calculator 308 is responsible for determining, based on the content of the database 320 and information provided by the user, benefits that this company can gain from addressing the business challenges identified as most important by the user. In one embodiment, the benefits assess the potential impact on annual revenue, annual selling, general and administrative (SG&A) costs, customer satisfaction, and employee morale. One embodiment of a benefits calculation process will be discussed in more detail below.

The access controller 310 determines whether the user is authorized to access certain information provided by the diagnostic tool 300. In one embodiment, the information provided by the diagnostic tool 300 is divided into two parts: information associated with adoption assessment and benefit estimation and information associated with business processes and best practices. A user with access level 1 may be allowed to only access the information associated with adoption assessment and benefit estimation, while a user with access level 2 may be allowed to access any information provided by the diagnostic tool 300.

The business process identifier 312 is responsible for identifying relevant business processes that can address the business challenges of the organization. In one embodiment, the relevant business processes are identified by searching the business process database 316 that stores business process information in association with corresponding business challenges.

In one embodiment, the business process database 316 stores names of business processes, their detailed information (e.g., input/output performance metrics, products required to implement business processes, etc.), links to relevant success stories of other customers, and links to relevant best practice recommendations.

The UI module 304 is responsible for presenting to the user a business process UI that displays a list of business challenges identified by the user and one or more relevant business processes for each business challenge in the list. The business process UI allows the user to request further information about a specific business process.

The best practice recommendation module 314 is responsible for identifying best practice recommendations for each relevant business process. The best practice recommendations include strategic best practice recommendations and functional best practice recommendations. Strategic best practice recommendations focus on what the company has to do to introduce the relevant business process into the company's infrastructure. Functional best practice recommendations focus on how to optimize the introduction of the relevant business process to capture the greatest business value. The best practice recommendations are developed based on experience and expertise (e.g., experience with prior customers) obtained over a period of time (e.g., over 10 years).

Accordingly, the diagnostic tool 300 allows the users to articulate and prioritize their business challenges and to understand the benefits from addressing these challenges. In addition, the diagnostic tool 300 provides the users with the solution that can address their business challenges and recommends how to implement this solution to capture the greatest business value.

Figure 4:
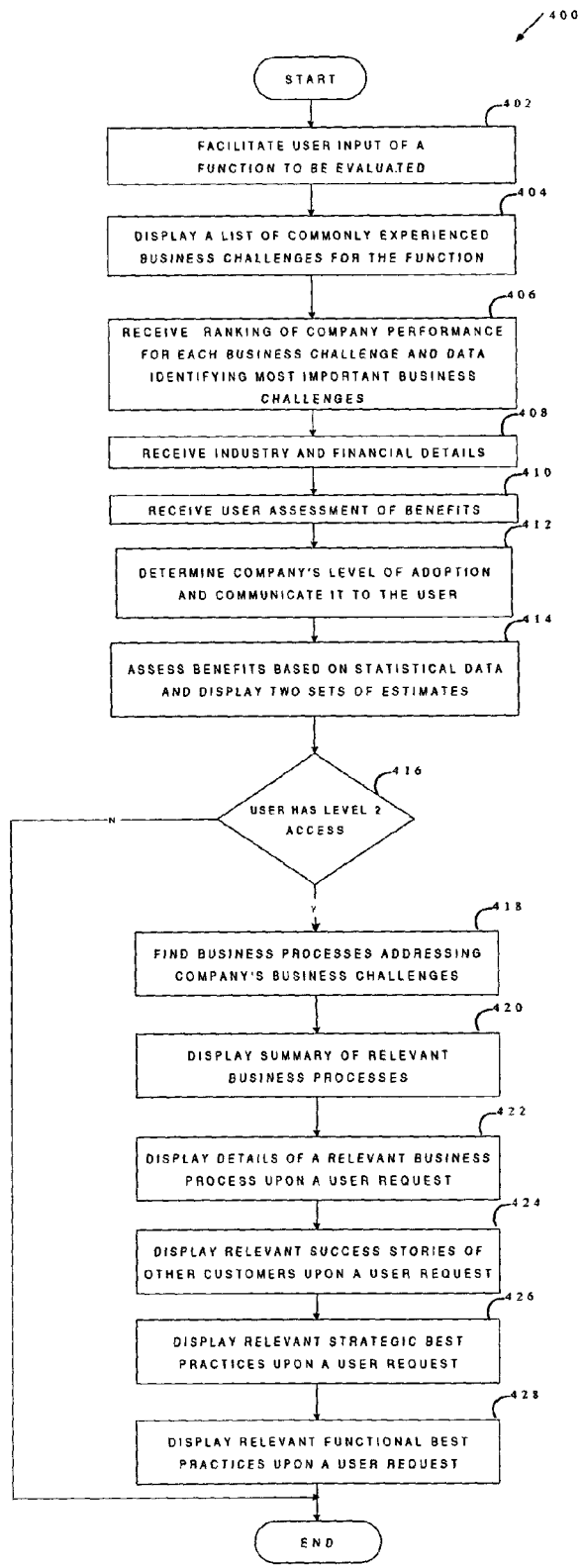
FIG. 4 is a flow diagram of one embodiment of a diagnostic process.

FIG. 4 is a flow diagram of one embodiment of a diagnostic process 400. The process may be performed by processing logic that may comprise hardware (e.g., circuitry, dedicated logic, etc.), software (such as run on a general purpose computer system or a dedicated machine), or a combination of both.

Referring to FIG. 4, process 400 begins with processing logic facilitating user selection of a function to be evaluated (processing block 402). At processing block 404, processing logic displays a list of business challenges commonly experienced by various companies when performing the selected function. At processing block 406, processing logic receives data specifying user ranking of the company performance for each business challenge on the list and data identifying most important business challenges for the company.

Next, processing logic receives user-provided data identifying the company's industry and financial details (processing block 408) and data identifying user assessment of benefits that can be achieved from addressing the important business challenges (processing block 410).

At processing block 412, processing logic determines the company's level of adoption and communicates the level of adoption to the user. At processing block 414, processing block assesses benefits that the company can achieve from addressing the important business challenges based on statistical information and displays these estimated benefits to the user, together with the benefits assessed by the user.

At decision box 416, processing logic determines whether the user has a level 2 access. If not, process 400 ends. If so, process 400 flows to processing block 418.

At processing block 418 processing logic identifies relevant business processes that can address the business challenges of the company and displays the summary of the relevant business processes to the user at processing block 420. At processing block 422, in response to a user request, processing logic displays details of a relevant business process. These details may include, for example, in-process performance metrics, results and output performance metrics, products required to implement the business processes, a list of relevant success stories of other customers, a list of strategic best practices, a list of functional best practices, and a list of other relevant business processes.

At processing block 424, in response to a user request, processing logic displays details about a relevant success story of another customer.

At processing block 426, in response to a user request, processing logic displays details about a relevant strategic best practice.

Afterwards, at processing block 428, in response to a user request, processing logic displays details about a relevant functional best practice.

Figure 5:
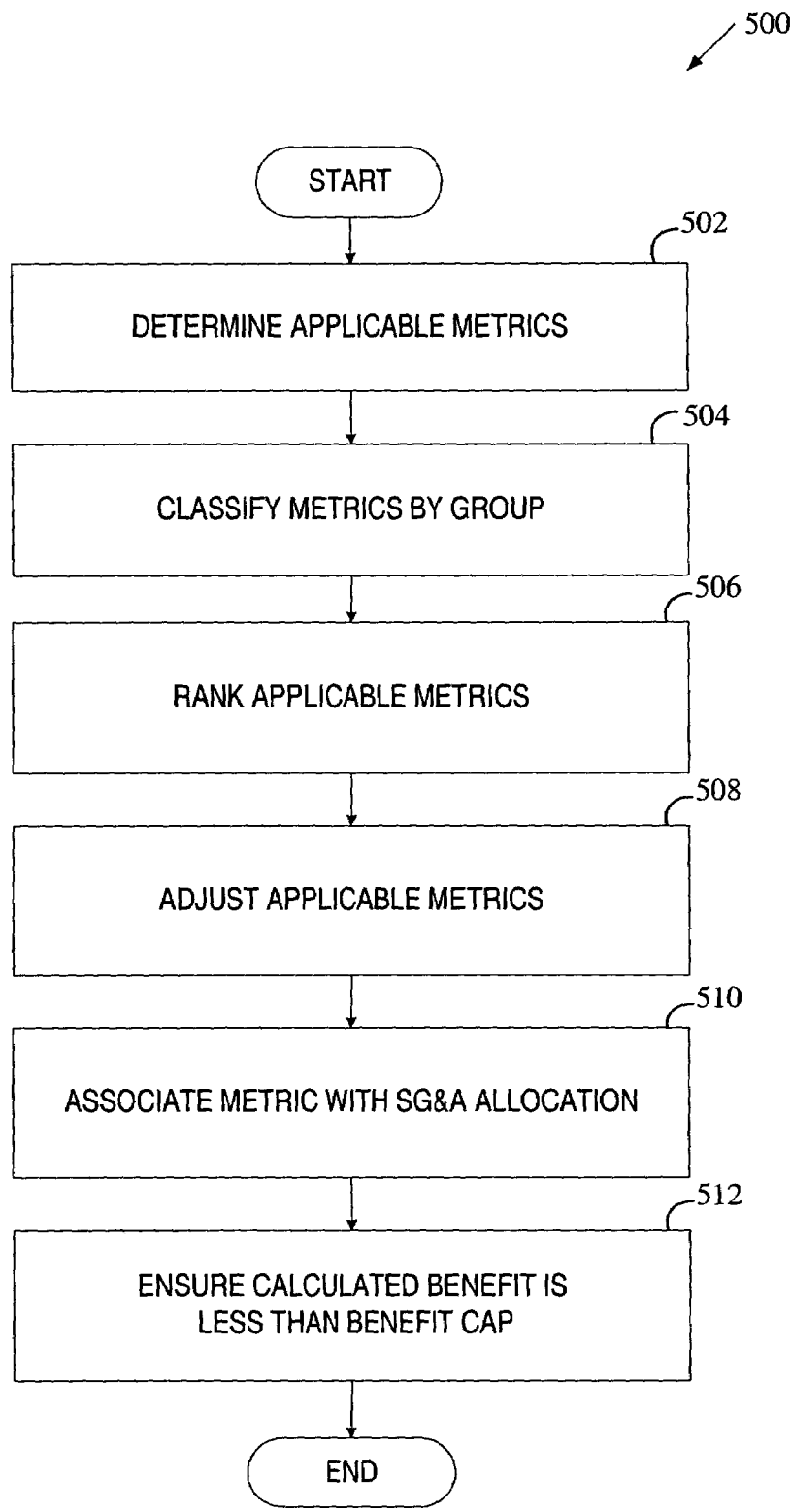
FIG. 5 is a flow diagram of one embodiment of a process for assessing benefits that a company can gain from addressing its business challenges.

FIG. 5 is a flow diagram of one embodiment of a process 500 for assessing benefits that a company can gain from addressing its business challenges. The process may be performed by processing logic that may comprise hardware (e.g., circuitry, dedicated logic, etc.), software (such as run on a general purpose computer system or a dedicated machine), or a combination of both.

Referring to FIG. 5, processing logic begins with determining metrics applicable to user-identified most important business challenges (processing block 502). Metrics are referred to statistical data identifying high impact and low impact on various benefit groups. The benefit groups correspond to financial parameters such as annual revenue, annual SG&A costs, customer satisfaction, and employee morale.

At processing block 504, processing logic classifies the applicable metrics by benefit group (e.g., annual revenue, annual SG&A costs, customer satisfaction, and employee morale).

At processing block 506, processing logic ranks the applicable metrics based on the user-provided rankings of the business challenges associated with the applicable metrics.

At processing block 508, processing logic adjusts the applicable metrics depending on the ranking to reflect diminishing returns (e.g., the metric with the ranking of 1 is not adjusted, the metric with the ranking of 2 is adjusted by 75%, the metric with the ranking of 3 is adjusted by 90%, and the metric with the ranking of 4 is adjusted by 100%).

At processing block 510, processing logic multiplies the adjusted metrics by revenue or SG&A allocation by industry.

At processing block 512, processing logic ensures that the sum of resulting benefits in the group is less than a maximum allowed benefit for the group. If the maximum allowed benefit is exceeded, all benefits in the group are adjusted.

Exemplary User Interfaces

Exemplary user interfaces provided by one embodiment of the diagnostic tool 300 will now be discussed in conjunction with FIGS. 6-14.

Referring to FIG. 6A, a choose function UI facilitates a user selection of a function to be evaluated. Existing inputs and results are saved for each function diagnosed and can be access by the user at a late time.

Referring to FIG. 6B, a pain points UI displays a list of business challenges (referred to as pain points) commonly experienced by various companies in the area of operation selected by the user via the choose function UI (the service function). The pain points UI requests the user to rank the performance of the company for each pain point on a scale of 1 to 4 and to identify the three pain points that are most important to the company.

Referring to FIG. 7, an industry and revenue UI facilitates user selection of the industry and user input of the most recent annual revenue. In response total annual selling, general and administrative (SG&A) costs are determined based on the statistical data for the specified revenue and industry. The user may then overwrite either the dollar amount or the percentage.

Referring to FIG. 8, a benefits self assessment UI facilitates the user input of estimates for the benefits that the company can achieve from successfully addressing the most important pain points. The benefits assess the potential impact on annual revenue, annual SG&A costs, customer satisfaction, and employee morale.

Referring to FIG. 9, an adoption assessment UI provides a classification of the company into one of four levels of adoption based on the type and severity of pain points identified by the user for the function.

Referring to FIG. 10, a benefits summary UI provides two sets of estimates: the first set of estimates based on the data provided by the user and the second set of estimates based on statistical data.

Referring to FIG. 11, a business process summary UI displays a set of relevant business processes for each identified pain point. The user may click on a business process identifier to request detailed information for the business process.

Figure 12:
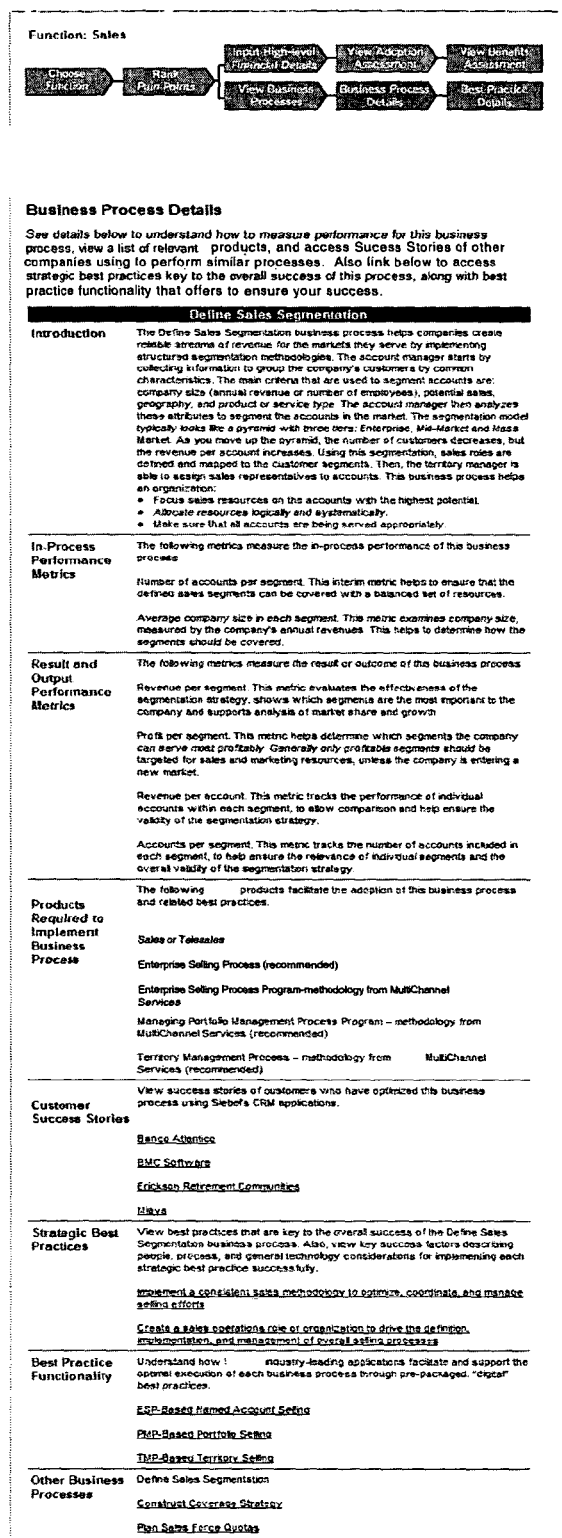

Referring to FIG. 12, a business process detail UI provides detailed information about the selected business process, including the description of the business process, performance metrics, products required to implement the business process, a link to a relevant success story of another customer, a link to strategic best practices and a link to functional best practices.

Referring to FIG. 13, a strategic best practice UI provides strategic best practice recommendations.

Referring to FIG. 14, a functional best practice UI provides functional best practice recommendations.

In one embodiment, the UIs illustrated in FIGS. 11-14 may not be accessible to the user unless the user has a level 2 access. The level 2 access may be granted to existing customers who pay maintenance fee or to prospective customers who request this privilege and meet certain qualification criteria.

An Exemplary Computer System

Figure 15:
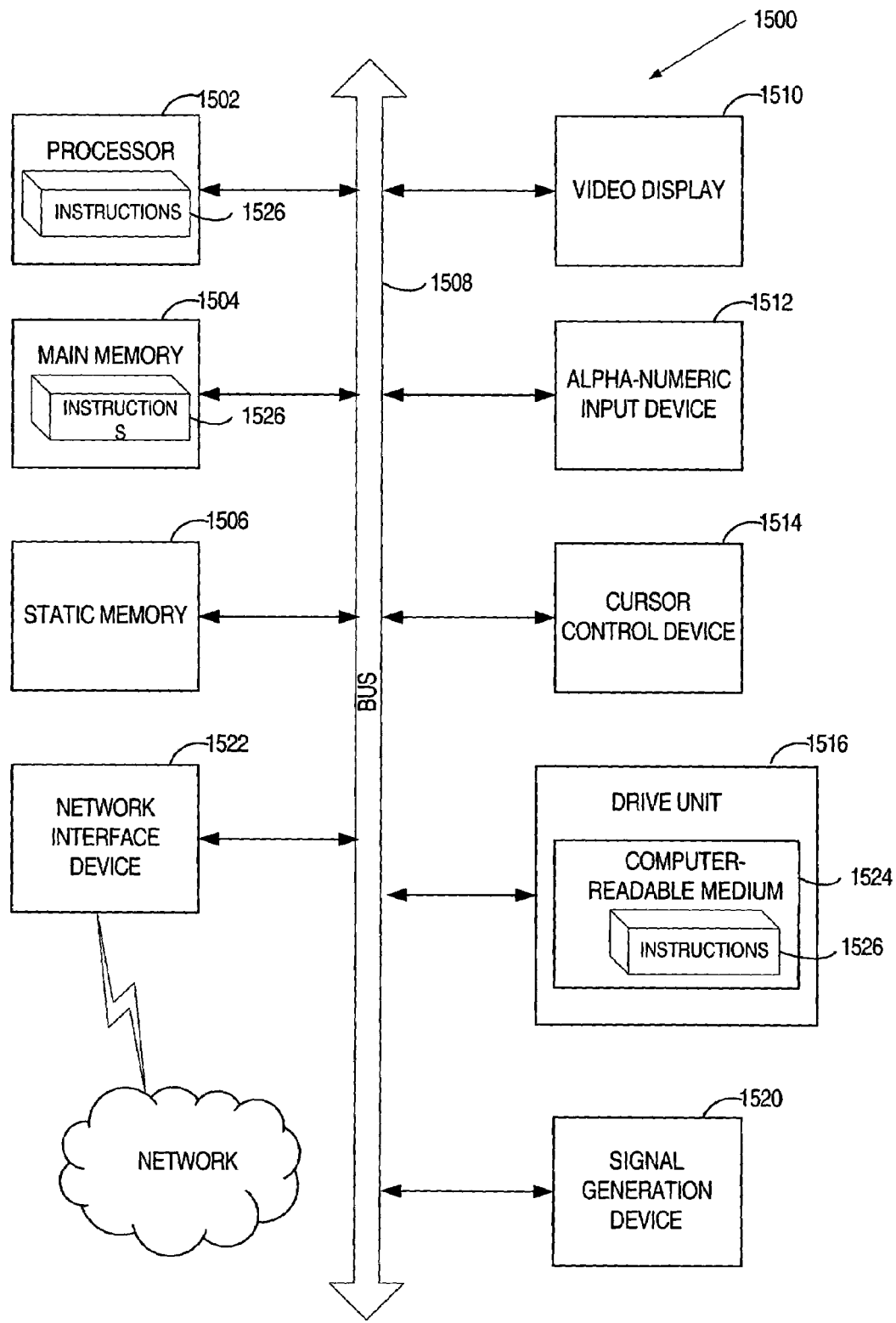
FIG. 15 is a block diagram of an exemplary computer system.

FIG. 15 is a block diagram of an exemplary computer system 1500 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alpha-numeric input device 1512 (e.g., a keyboard), a cursor control device 1514 (e.g., a mouse), a disk drive unit 1516, a signal generation device 1520 (e.g., a speaker) and a network interface device 1522.

The disk drive unit 1516 includes a computer-readable medium 1524 on which is stored a set of instructions (i.e., software) 1526 embodying any one, or all, of the methodologies described above. The software 1526 is also shown to reside, completely or at least partially, within the main memory 1504 and/or within the processor 1502. The software 1526 may further be transmitted or received via the network interface device 1522. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:

receiving user-specified information pertaining to one or more business challenges of an organization, wherein the user-specified information comprises information describing a level at which the organization performs in meeting each of the one or more business challenges, the information describing the levels comprises a plurality of user-specified rankings, the plurality of user-specified rankings comprises one user-specified ranking of organization performance for each of the one or more business challenges, and each of the plurality of user-specified rankings represents a ranking on a ranking scale;

identifying, using a processor, one or more predefined business processes that address the one or more business challenges of the organization, wherein the identifying comprises accessing a business process database coupled to the processor;

estimating, using the processor, benefits that are to be gained by the organization when the one or more business challenges are successfully addressed, wherein the estimating comprises ranking a plurality of metrics based on one or more of the plurality of user-specified rankings, and adjusting the plurality of metrics based on the ranking of the plurality of metrics; and providing a recommendation to a user, wherein the recommendation identifies at least one of the one or more predefined business processes, the providing comprises displaying the recommendation on a display, and
the display is coupled to the processor.

2. The method of claim 1 wherein
the receiving user-specified information pertaining to one or more business challenges of an organization comprises communicating to the user a list of business challenges commonly experienced by a plurality of companies; and
the method further comprises considering at least one of the plurality of user-specified ranking when identifying the one or more predefined business processes.

3. The method of claim 2 wherein
the receiving user-specified information pertaining to one or more business challenges of an organization further comprises receiving user-specified information indicating importance of business challenges within the list to the organization; and
the method further comprises considering the importance of the business challenges when identifying the one or more predefined business processes.

4. The method of claim 2 wherein the list of commonly experienced business challenges is specific to a one of a plurality of functions that is selected by the user for evaluation.

5. The method of claim 4 further comprising:
maintaining a database of commonly experiences business challenges associated with the plurality of functions.

6. The method of claim 4 further comprising:
maintaining a database of commonly experiences business challenges associated with specific industries.

7. The method of claim 1 further comprising requesting the user to enter industry and revenue data associated with the organization.

8. The method of claim 1 further comprising assessing an adoption level of an automated technology by the organization based on the one or more business challenges and the industry and revenue data.

9. The method of claim 1 wherein the benefits are estimated using statistical data.

10. The method of claim 1 wherein recommending the one or more predefined business processes to a user comprises:
displaying to the user each of the one or more business challenges with at least one of the one or more predefined business processes that addresses said each of the one or more business challenges.

11. The method of claim 10 further comprising:
allowing the user to view detailed business process information for the at least one of the one or more predefined business processes.

12. The method of claim 1 further comprising:
identifying a software product required to implement each of the one or more predefined business processes.

13. The method of claim 1 further comprising:
mapping each of the one or more predefined business processes to a corresponding best practice strategy recommendation and a corresponding best practice functionality recommendation; and
allowing the user to view the corresponding best practice strategy recommendation and the corresponding best practice functionality recommendation.

14. The method of claim 1 further comprising:
allowing the user to view performance metrics associated with the one or more predefined business processes; and
allowing the user to view a success story of a customer who has implemented at least one of the one or more predefined business processes.

15. A method comprising:
receiving user-specified information pertaining to one or more business challenges of an organization, wherein
the user-specified information comprises information describing a level at which the organization performs in meeting each of the one or more business challenges,
the information describing the levels comprises a plurality of user-specified rankings,
the plurality of user-specified rankings comprises one user-specified ranking of organization performance for each of the one or more business challenges, and
each of the plurality of user-specified rankings represents a ranking on a ranking scale;
identifying, using a processor, one or more best practices that address the one or more business challenges of the organization, wherein
the identifying comprises accessing a business practice database coupled to the processor;
estimating, using the processor, benefits that are to be gained by the organization when the one or more best practices are successfully implemented, wherein
the estimating comprises
ranking a plurality of metrics based on one or more of the plurality of user-specified rankings, and
adjusting the plurality of metrics based on the ranking of the plurality of metrics; and
recommending the one or more best practices to a user.

16. The method of claim 15 wherein
the receiving user-specified information pertaining to one or more business challenges of an organization comprises communicating to the user a list of business challenges commonly experienced by a plurality of companies; and
the method further comprises considering at least one of the plurality of user-specified rankings when identifying the one or more best practices.

17. The method of claim 16 wherein
the receiving user-specified information pertaining to one or more business challenges of an organization further comprises receiving user-specified information indicating importance of business challenges within the list to the organization; and
the method further comprises considering the importance of the business challenges when identifying the one or more best practices.

18. The method of claim 16 wherein the list of commonly experienced business challenges is specific to a one of a plurality of functions that is selected by the user for evaluation.

19. The method of claim 15 wherein recommending the one or more best practices to a user comprises:
displaying to the user each of the one or more business challenges with at least one of the one or more best practices that addresses said each of the one or more business challenges.

20. The method of claim 19 further comprising:
allowing the user to view detailed best practice information for the at least one of the one or more best practices.

21. A machine-readable medium having executable instructions to cause a machine to perform a method comprising:
receiving user-specified information pertaining to one or more business challenges of an organization, wherein
the user-specified information comprises information describing a level at which the organization performs in meeting each of the one or more business challenges, the information describing the levels comprises a plurality of user-specified rankings, the plurality of user-specified rankings comprises one user-specified ranking of organization performance for each of the one or more business challenges, and each of the plurality of user-specified rankings represents a ranking on a ranking scale;

identifying one or more predefined business processes that address the one or more business challenges of the organization;

estimating benefits that are to be gained by the organization when the one or more business challenges are successfully addressed, wherein the estimating comprises ranking a plurality of metrics based on one or more of the plurality of user-specified rankings, and adjusting the plurality of metrics based on the ranking of the plurality of metrics; and providing a recommendation to a user, wherein the recommendation identifies at least one of the one or more predefined business processes.

22. The machine readable medium of claim 21 wherein the receiving user-specified information pertaining to one or more business challenges of an organization comprises communicating to the user a list of business challenges commonly experienced by a plurality of companies; and the identifying the one or more predefined business processes that address the one or more business challenges of the organization comprises considering at least one of the plurality of user-specified rankings.

23. A machine-readable medium having executable instructions to cause a machine to perform a method comprising:

receiving user-specified information pertaining to one or more business challenges of an organization, wherein the user-specified information comprises information describing a level at which the organization performs in meeting each of the one or more business challenges, the information describing the levels comprises a plurality of user-specified rankings, the plurality of user-specified rankings comprises one user-specified ranking of organization performance for each of the one or more business challenges, and each of the plurality of user-specified rankings represents a ranking on a ranking scale;

identifying one or more best practices that address the one or more business challenges of the organization;

estimating benefits that are to be gained by the organization when the one or more best practices are successfully implemented, wherein the estimating comprises ranking a plurality of metrics based on one or more of the plurality of user-specified rankings, and adjusting the plurality of metrics based on the ranking of the plurality of metrics; and recommending the one or more best practices to a user.

24. The machine readable medium of claim 23 wherein recommending the one or more best practices to a user comprises:

displaying to the user each of the one or more business challenges with at least one of the one or more best practices that addresses said each of the one or more business challenges.

25. A system comprising:

a memory; and at least one processor coupled to the memory, the processor executing a set of instructions which cause the processor to receive user-specified information pertaining to one or more business challenges of an organization, wherein the user-specified information comprises information describing a level at which the organization performs in meeting each of the one or more business challenges, the information describing the levels comprises a plurality of user-specified rankings, the plurality of user-specified rankings comprises one user-specified ranking of organization performance for each of the one or more business challenges, and each of the plurality of user-specified rankings represents a ranking on a ranking scale;

identify one or more predefined business processes that address the one or more business challenges of the organization;

estimate benefits that are to be gained by the organization when the one or more business challenges are successfully addressed, wherein the estimating comprises ranking a plurality of metrics based on one or more of the plurality of user-specified rankings, and adjusting the plurality of metrics based on the ranking of the plurality of metrics; and provide a recommendation to a user, wherein the recommendation identifies at least one of the one or more predefined business processes.

26. The system of claim 25 wherein the processor is to receive user-specified information pertaining to one or more business challenges of an organization by communicating to the user a list of business challenges commonly experienced by a plurality of companies, and the identifying the one or more predefined business processes that address the one or more business challenges of the organization comprises considering at least one of the user-specified rankings.

27. The system of claim 26 wherein the processor is to receive user-specified information pertaining to one or more business challenges of an organization by receiving user-specified information indicating importance of business challenges within the list to the organization, and the set of instructions further cause the processor to consider the importance of the business challenges when identifying the one or more predefined business processes.

28. The system of claim 25 wherein the processor is to recommend the one or more predefined business processes to a user by displaying to the user each of the one or more business challenges with at least one of the one or more predefined business processes that addresses said each of the one or more business challenges.

29. The system of claim 25 wherein the processor is further to map each of the one or more predefined business processes to a corresponding best practice strategy recommendation and a corresponding best practice functionality recommendation, and to allow the user to view the corresponding best practice strategy recommendation and the corresponding best practice functionality recommendation.

30. A system comprising:
a memory; and
at least one processor coupled to the memory, the processor executing a set of instructions which cause the processor to
receive user-specified information pertaining to one or more business challenges of an organization, wherein
the user-specified information comprises information describing a level at which the organization performs in meeting each of the one or more business challenges,
the information describing the levels comprises a plurality of user-specified rankings,
the plurality of user-specified rankings comprise one user-specified ranking of organization performance for each of the one or more business challenges, and
each of the plurality of user-specified rankings represents a ranking on a ranking scale;
identify one or more best practices that address the one or more business challenges of the organization;
estimate benefits that are to be gained by the organization when the one or more best practices are successfully implemented, wherein
the estimating comprises
ranking a plurality of metrics based on one or more of the plurality of user-specified rankings, and
adjusting the plurality of metrics based on the ranking of the plurality of metrics; and
recommend the one or more best practices to a user.

31. The system of claim 30 wherein
the processor is to receive user-specified information pertaining to one or more business challenges of an organization by communicating to the user a list of business challenges commonly experienced by a plurality of companies, and
the set of instructions further cause the processor to consider at least one of the plurality of user-specified rankings when identifying the one or more best practices.

32. The system of claim 30 wherein the processor is to recommend the one or more best practices to a user by displaying to the user each of the one or more business challenges with at least one of the one or more best practices that addresses said each of the one or more business challenges.

33. The system of claim 32 wherein the processor is further to allow the user to view detailed best practice information for the at least one of the one or more best practices.

34. The method of claim 8 wherein the automated technology is at least one of customer relationship management (CRM), partner relationship management (PRM), and employee relationship management (ERM).

* * * * *

UNITED STATES PATENT AND TRADEMARK OFFICE
CERTIFICATE OF CORRECTION

PATENT NO. : 7,684,993 B2  
APPLICATION NO. : 10/661877  
DATED : March 23, 2010  
INVENTOR(S) : Peter McCullagh et al.

Page 1 of 1

It is certified that error appears in the above-identified patent and that said Letters Patent is hereby corrected as shown below:

In column 11, line 11, in Claim 2, delete "ranking" and insert -- rankings --, therefor.

In column 11, line 23, in Claim 4, after "to" delete "a".

In column 12, line 49, in Claim 18, after "to" delete "a".

Signed and Sealed this
Fifteenth Day of March, 2011

David J. Kappos
*Director of the United States Patent and Trademark Office*